United States Patent [19]
Klas et al.

[11] Patent Number: 5,570,570
[45] Date of Patent: Nov. 5, 1996

[54] RIDE-ON MOWER STEERING AND SUSPENSION SYSTEM

[75] Inventors: Kenneth H. Klas; Edward Freier, Jr., both of Port Washington; Michael P. Schemelin, West Bend; Daniel W. Schaefer, Port Washington; Gary A. Hays, Cedarburg, all of Wis.

[73] Assignee: Simplicity Manufacturing, Inc., Port Washington, Wis.

[21] Appl. No.: 437,156

[22] Filed: Jun. 7, 1995

Related U.S. Application Data

[62] Division of Ser. No. 92,971, Jul. 16, 1993, Pat. No. 5,474,315.

[51] Int. Cl.⁶ .................................................. A01D 34/74
[52] U.S. Cl. .................. 56/17.1; 56/DIG. 14; 280/112.2
[58] Field of Search ................................. 56/17.1, 17.2, 56/15.8, DIG. 14; 280/112.2, 689

[56] References Cited

U.S. PATENT DOCUMENTS

| | | | |
|---|---|---|---|
| 4,787,646 | 11/1988 | Kamlukin et al. | 56/15.8 X |
| 5,161,353 | 11/1992 | Bergkamp et al. | 56/6 |
| 5,161,822 | 11/1992 | Lund | 280/689 X |
| 5,381,647 | 1/1995 | Eberle | 56/15.8 |
| 5,437,467 | 8/1995 | Patin | 280/112.2 |

*Primary Examiner*—Terry Lee Melius
*Attorney, Agent, or Firm*—Reinhart, Boerner, Van Deuren, Norris & Rieselbach, s.c.

[57] ABSTRACT

A steering and suspension system for a ride-on mower. A wheel is connected to a spindle and rotates about a first axis of rotation. The spindle is coupled to a frame and rotates about a second axis of rotation that is inclined from vertical backward substantially along a longitudinal axis of the ride-on mower. A level adjusting device is coupled to a steering component of the ride-on mower and is also coupled to a lawn mower accessory. The level adjusting device offsets vertical displacements caused by the inclined spindles, thereby allowing the accessory to stay level when turning the ride-on mower.

18 Claims, 9 Drawing Sheets

RIDE-ON MOWER STEERING AND SUSPENSION SYSTEM

This is a divisional of application Ser. No. 08/092,971 filed on Jul. 16, 1993 now U.S. Pat. No. 5,474,315.

The present invention relates generally to an apparatus and method for steering and providing a suspension for a ride-on mower. More particularly, the invention relates to an improved apparatus and method for steering and suspending a ride-on mower wherein novel mechanical components provide improved ride-on mower steering, static and dynamic stability and handling characteristics.

Prior art ride-on mowers have generally lacked high static and dynamic stability. (As used herein, "ride-on mower" shall refer to vehicles capable of carrying and powering accessories for cutting vegetation, whether or not such accessories are coupled to the unit.) This instability has typically resulted from the high centers of gravity and rigid suspension systems of prior art devices. Commonly-used rigid suspension systems have typically been incapable of transferring weight from one portion of the ride-on mower to another to offset centrifugal forces and/or weight transferred due to traversing inclines. These limitations have reduced the effectiveness and versatility of prior art ride-on mowers.

Further, prior art devices have generally experienced various traction problem during normal operation. For example, when traversing undulating terrain, the rigid suspension systems of the prior art devices can allow one or more wheels to become substantially unloaded. This unloading can cause wheel spin to occur with attendant turf damage, as well as immobilization of the tractor. While this problem has been addressed to some extent by using limited slip differentials, these limited slip differentials can produce a "plowing" effect whereby the front wheels experience understeer. This effect is exacerbated when the tractor suspension system is incapable of transferring weight to an unloaded wheel. In addition to being a potential safety hazard, this understeer can cause substantial damage to the lawn. Further, many conventional limited slip differentials produce parasitic power losses by frictionally engaging powertrain components. Accordingly, increased tractor fuel efficiency, power and steering capability are possible if limited slip differentials can be avoided.

It is therefore an object of the invention to provide an improved method and apparatus for steering a ride-on mower.

It is another object of the invention to provide a novel apparatus and method for suspending a ride-on mower.

It is a further object of the invention to provide an improved steering and suspension system which is capable of transferring weight from one portion to another portion of the ride-on mower.

It is an additional object of the invention to provide a novel ride-on mower steering and suspension device which produces increased static and dynamic stability in comparison to prior art devices.

It is a still further object of the invention to provide an improved method and apparatus for leveling a ride-on mower accessory in response to vertical displacement caused by the ride-on mower steering and/or suspension system.

It is another object of the invention to provide a novel method and apparatus for steering and suspending a rear-engine ride-on mower which offers improved handling characteristics.

It is an additional object of the invention to provide a novel method and apparatus for steering and suspending a ride-on mower utilizing position restoring means to smoothly dampen suspension movement.

It is a further object of the invention to provide an improved method and apparatus for steering and suspending a front-engine ride-on mower which offers improved handling characteristics.

It is another object of the invention to provide an improved method and apparatus for steering and suspending a ride-on mower which reduces or eliminates the need for a limited slip differential.

It is an additional object of the invention to provide a novel ride-on mower steering system which enables a majority of the weight of the ride-on mower to bear on inner portions of its steering tires during a turning operation.

It is a still further object of the invention to provide an improved apparatus and method for leveling a ride-on mower cutting deck in response to ride-on mower frame displacements.

It is yet another object of the invention to provide a method of maximizing desirable weight transfer while turning a vehicle by selecting an optimal spindle angle for the vehicle.

Other advantages and features of the invention, together with the organization and the manner of operation thereof, will become apparent from the following detailed description when taken in conjunction with the accompanying drawings, wherein like elements have like numerals throughout the drawings.

BRIEF DESCRIPTION OF THE DRAWINGS

FIG. 6 shows a cam profile constructed in accordance with the alternative embodiment of the steering assembly illustrated in FIG. 5;

DETAILED DESCRIPTION OF PREFERRED EMBODIMENTS

Figure 1:
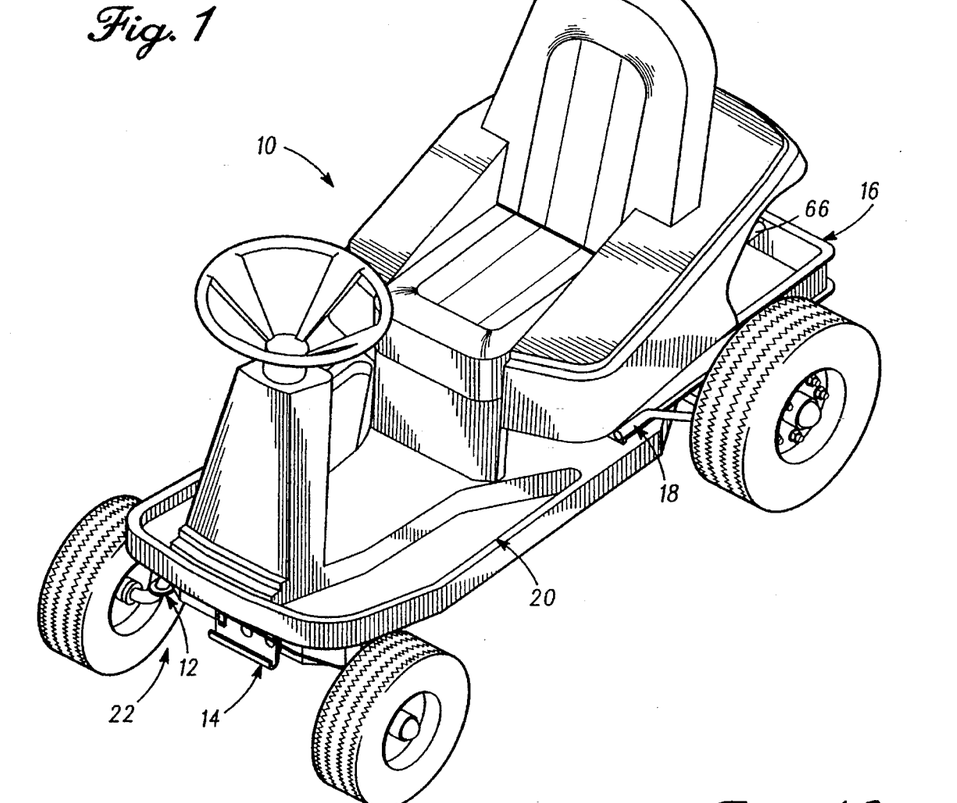
FIG. 1 illustrates a perspective view of an improved steering and suspension system constructed in accordance with one form of the invention.

Referring to the figures and more particularly to FIG. 1, a ride-on mower steering and suspension system constructed in accordance with one form of the invention is indicated generally at 10. The system 10 preferably comprises a spindle assembly 12, a leveling assembly 14, a pivoting carrier assembly 16 and a torsion bar assembly 18, all of which are coupled to a riding ride-on mower 20. Each of these assemblies creates its own beneficial effects and offsets any undesired effects of the other assemblies as described in further detail hereinbelow.

As shown in FIGS. 1–4 as a nonlimiting example, the spindle assembly 12 preferably comprises substantially L-shaped spindles 24 supported in cylindrical bearings 26 inserted in steel tubes 28. The steel tubes 28 are welded to a frame 30 of the ride-on mower 20. The cylindrical bearings 26 rotatably couple the spindles 24 to the frame 30 of the ride-on mower 20. A lower portion 32 of the spindle 24 is rotatably coupled to a wheel 34 using conventional bearings and connection techniques.

An upper portion 36 of the spindle 24 extends through the cylindrical bearings 26, and the cylindrical bearings 26 are angled backward along a longitudinal axis 38 (see FIG. 2) of the ride-on mower 20 to produce negative caster. In other words, the lower portion 32 of the spindle 24 is located forward of part of the upper portion 36 of the spindle 24. This orientation provides significant handling advantages and load transfer characteristics which will be described in greater detail herein.

Figure 4A:
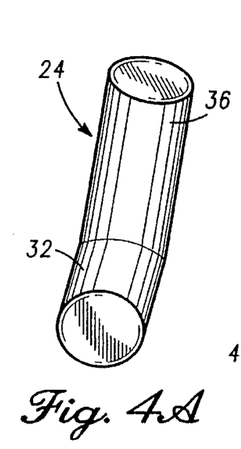
FIG. 4A shows a side view of an angled left side spindle in a straight ahead steering configuration.
Figure 4B:
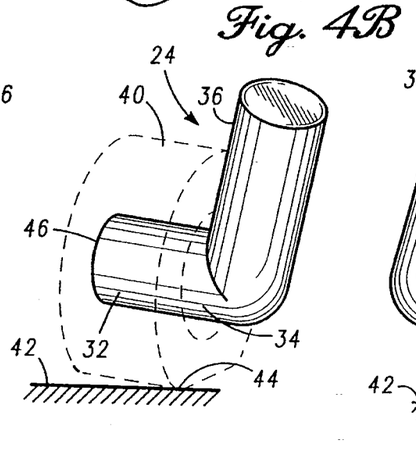
FIG. 4B illustrates a side view of an angled left spindle in a right turn.
Figure 4C:
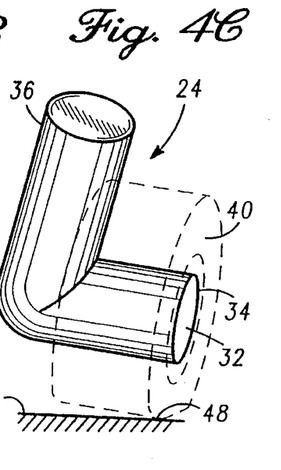
FIG. 4C shows a side view of an angled right spindle in a right turn configuration.

Negative caster is shown in FIG. 4A where the lower portion 32 of the spindle 24 is generally horizontal in a "straight ahead" steering configuration. FIG. 4B illustrates a side view of the left spindle 24 in a right turn steering configuration. The upper portion 36 of the spindle 24 is still held at the same angle of caster, but has rotated almost 90° to a right turn configuration. This effectively raises the outer edge 46 of the lower portion 32 of the spindle 24. Because a wheel 34 and a tire 40 are coupled to the lower portion 32 of the spindle 24, the inner surface 44 of the left tire 40 contacts the turf 42 (see FIG. 4B). Conversely, the right spindle 24 behaves in an opposite manner, thereby dropping its coupled wheel 34 slightly. Accordingly, in a right turn (see FIG. 4B), the tractor 20 rides on the inner surface 44 of the left tire 40 which is affixed to the wheel 34 and the spindle 24, while the right tire 40 rides on the right tire outer edge 48 (see FIG. 4C). This tire configuration is similar to a skier using ski edges to turn effectively. Moreover, the outside tire 40 is riding on its inner surface 44, which is a sorer edge and can reduce turf damage. During a left turn (see FIG. 4C), the lower portion 32 of the left spindle 24 pitches downward and the lower portion 32 of the right spindle 24 pitches upward, thereby reversing the configuration previously described.

It should be noted that because the inner and outer wheels 34 in a turn do not necessarily turn the same distance inward, the amount of lift generated by one side can exceed the amount of drop generated by the other side. For example, in the preferred embodiment described herein, the inside wheel 34 turns at a tighter angle than the outside wheel 34. This necessitates the spindle 24 corresponding to the inside tire 40 to turn farther, thereby increasing the wheel drop associated with the required rotation.

Figure 10A:
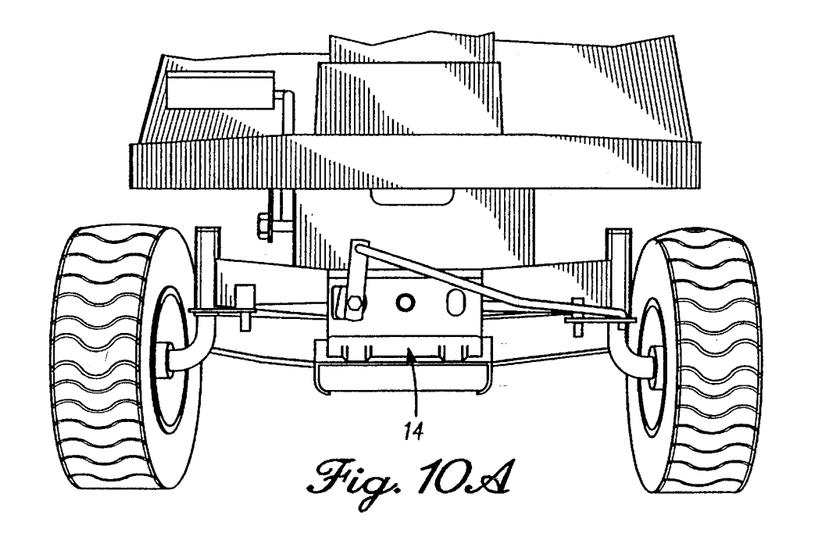
FIG. 10A shows a front view of a ride-on mower having a spindle assembly and a leveling assembly constructed in accordance with one form of the invention.
Figure 10B:
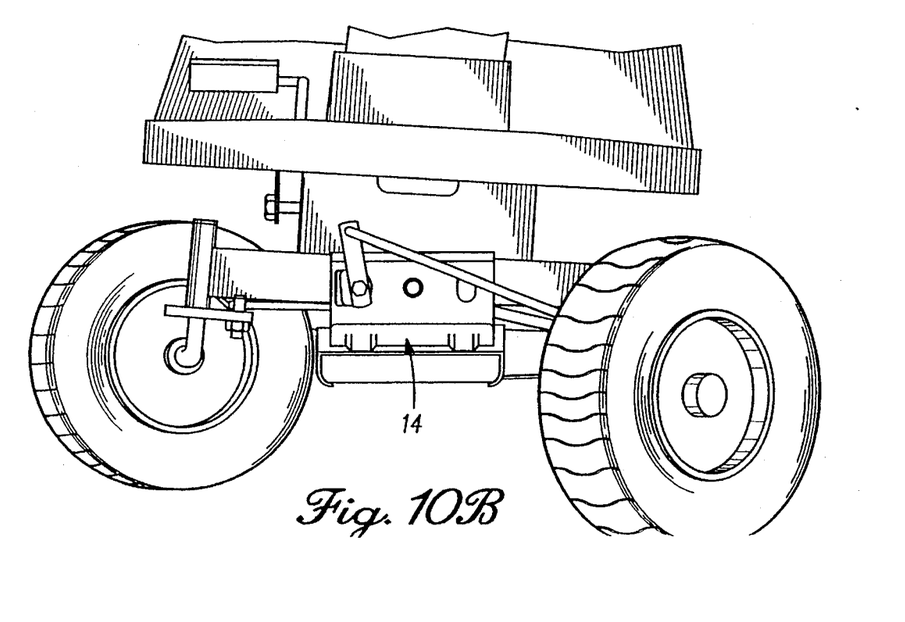
FIG. 10B shows a front view of the ride-on mower illustrated in FIG. 10A with steering turned in a right turn configuration.
Figure 10C:
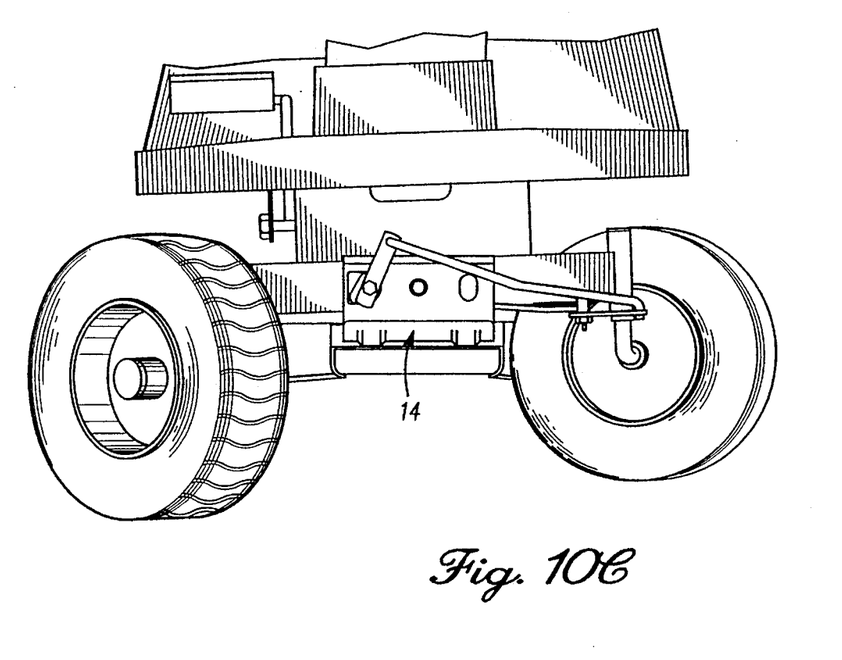
FIG. 10C shows a front view of the ride-on mower illustrated in FIGS. 10A and 10B with steering turned in a full left turn configuration.

As a wheel 34 drops due to the spindle 24 turning, this effectively raises the frame 30 connected to the cylindrical bearings 26 in which the spindles 24 are rotatably coupled (see FIGS. 10A–C). Conversely, as the opposite spindle 24 raises the wheel 34, the frame 30 effectively drops toward the ground as the clearance between the tire 40 and the frame 30 is reduced by the angled nature of the spindle 24. This vertical displacement of the frame 30 can tilt an accessory coupled to the frame 30. As a nonlimiting example, a ride-on mower cutting deck (not shown) can be tilted by the vertical displacement, thereby producing an undesirable uneven cut. The present invention provides a means of counteracting such vertical displacement so that consistent mowing heights are maintained on each side of the ride-on mower 20.

Figures 2, 5A, 5B, 5C:
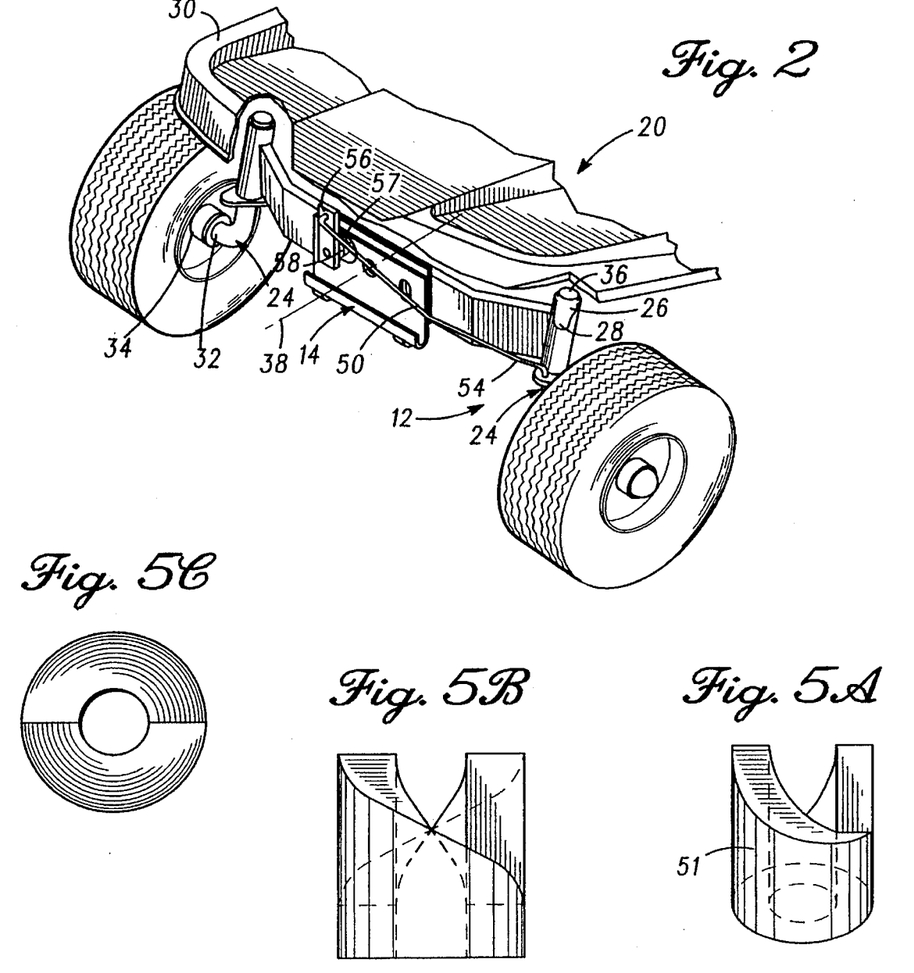
FIG. 2 shows a perspective view of a steering assembly and a leveling assembly.
Figures 3, 6A, 6B, 6C:
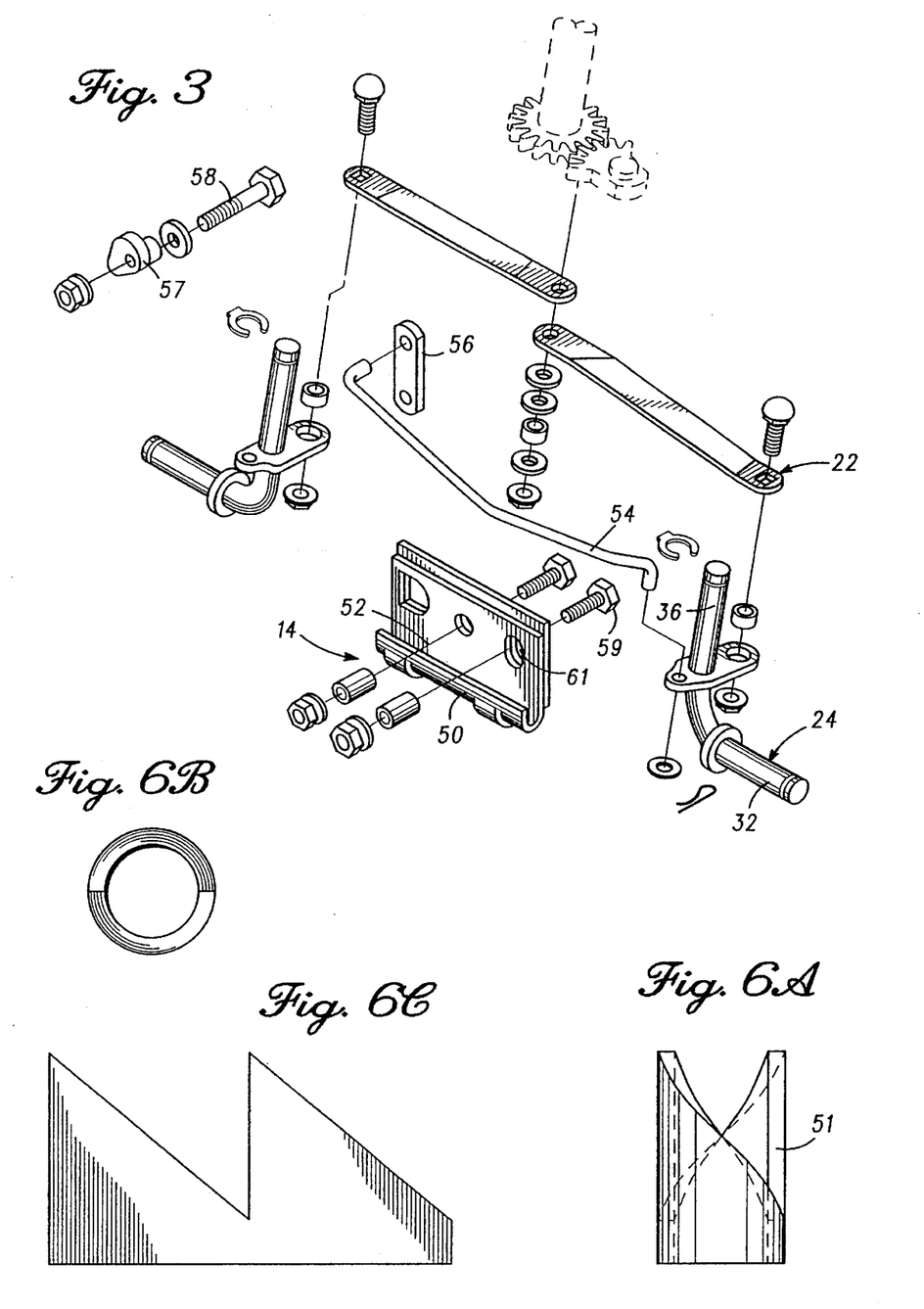
FIG. 3 illustrates an exploded view of a steering assembly and leveling assembly constructed in accordance with one form of the invention.

As shown in FIGS. 1–3, a leveling assembly 14 for counteracting this vertical displacement is shown. The leveling assembly 14 is connected to the steering assembly 22 by a leveling control rod 54 (best seen in FIG. 3). The leveling control rod 54 is connected at an outer end to a cam bracket 56 affixed to the left spindle 24. As the spindle 24 rotates, the leveling control rod 54 moves generally perpendicular to the longitudinal axis 38 (shown in FIG. 2) of the ride-on mower 20. The leveling control rod 54 is attached to the cam bracket 56. A lower end of the cam bracket 56 includes a hole through which a bolt 58 is inserted. The bolt 58 extends through a cam 57 and mounts the cam 56 for rotation with respect to the frame 30.

Figure 9A:
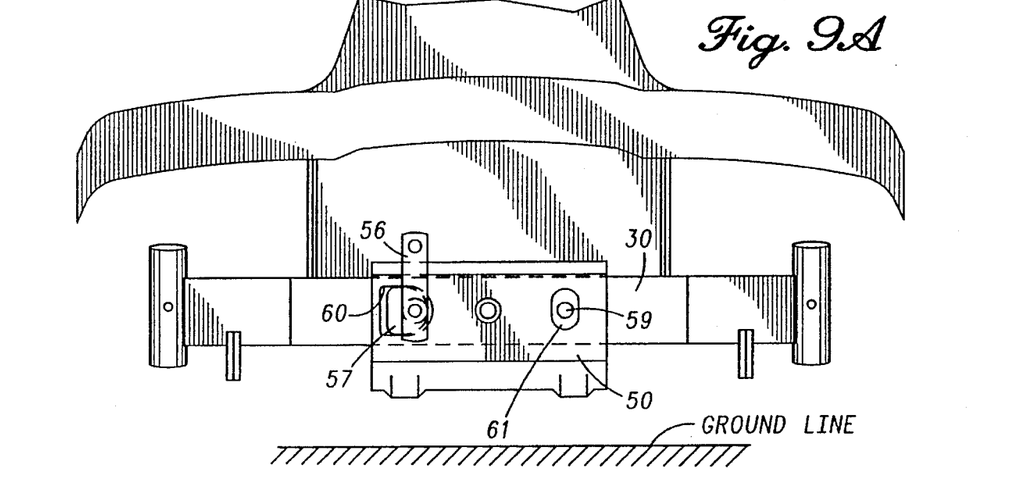
FIG. 9A illustrates a front view of a leveling system including a cam interacting with a follower surface of an accessory hitch.
Figure 9B:
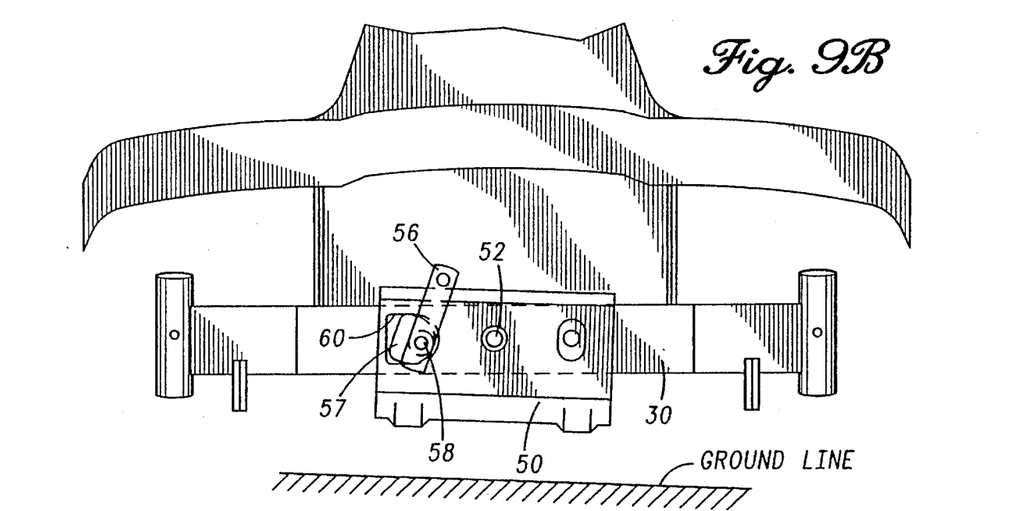
FIG. 9B shows a front view of the leveling system shown in FIG. 9A in a left turn configuration.

The cam 57 (see FIGS. 2, 3 and 7) engages an accessory hitch 50 (see FIGS. 2 and 8) which is pivotably mounted to the frame 30. The hitch 50 is provided with a cam follower surface 60 which engages the cam 57. As the cam 57 rotates, the cam follower surface 60 pivots the hitch 50 generally about its center axis 52, thereby substantially offsetting the vertical displacement caused by the angled spindles 24. FIGS. 9A and 9B illustrate how the cam bracket 56 rotates the cam 57 with respect to the frame 30 and the hitch 50. FIG. 9B shows this rotation and its effects. The cam 57 has rotated about the bolt 58, and the cam follower surface 60 has caused the hitch 50 to rotate about the center axis 52 while FIG. 9B illustrates a left turn configuration. It will be apparent to one skilled in the art that the cam 57 yields essentially linear displacement rates when actuated by the essentially linear vertical displacement of the angled spindles 24. Accordingly, a right turn configuration actuates the hitch 50 to pivot about the center axis 52 in an identical manner in the other direction. The movement of the hitch 50 can be limited through use of a limiting bolt 59 (see FIG. 9A) which can extend through a slot in the hitch 50 and can be provided with a bushing to facilitate pivoting through a desired range in the slot 61. It will be apparent to one skilled in the art that other linkage mechanisms can be fabricated to produce many of the advantages of the previously described apparatus.

The hitch 50 can be connected to a wide variety of accessories powered by the ride-on mower 20, including, but not limited to, a ride-on mower cutting deck (not shown). Further details regarding a connection of a hitch similar to the hitch 50 to suitable accessories can be found at column 1, line 53 through column 2, line 34, column 3, line 1 through column 4, line 59, and FIGS. 1–5, in U.S. Pat. No. 5,154,043, which is owned by the Assignee of the present invention and is incorporated by reference herein in its entirety. When a ride-on mower cutting deck is attached to the hitch 50, for example, a level cut is provided even as vertical displacement of a frame 30 is caused by turning of the angled spindles 24. When a snow plow (not shown) is connected to the hitch 50, the plow is kept level even as the ride-on mower 20 turns. Accordingly, power is transferred from the ride-on mower 20 to accessories while tilting corresponding to frame movement is not transferred. This is best shown in FIGS. 10A, 10B and 10C which illustrate a straight ahead, full right turn and full left turn configuration (respectively) of the leveling assembly 14.

TABLE I

LEVELING ASSEMBLY
HITCH/FRAME RELATIONSHIP

| TURN CONDITION | R.O. FRAME | R.I. HITCH | L.I. HITCH | L.O. FRAME |
|---|---|---|---|---|
| STRAIGHT | 15.63 | 8 | 8 | 15.63 |
| ½ RIGHT | 15.69 | 8 | 8 | 15.56 |
| FULL RIGHT | 15.75 | 8 | 8 | 15.50 |
| ½ LEFT | 15.56 | 8 | 8 | 15.69 |
| FULL LEFT | 15.50 | 8 | 8 | 15.75 |

NOTE: MEASUREMENT LOCATIONS ARE SHOWN ON FIG. 10B, FULL RIGHT HAND TURN. THESE ARE TYPICAL LOCATIONS FOR ALL CONDITIONS CHARTED ABOVE.

Table I illustrates the effectiveness of a leveling assembly construction in accordance with one form of the invention. The hitch 50 is kept level as vertical displacement of the frame 30 is caused by the turning of the angled spindles 24. It can further be seen from data in Table I that the relationship between turning and vertical displacement upon the frame 30 is essentially linear. Accordingly, the leveling assembly 14 provides an offsetting effect of vertical displacement caused by the angled spindles 24 as they rotate.

Figure 5D:
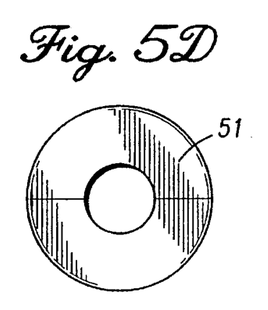
FIG. 5 illustrates an alternative embodiment of a cam steering assembly.
Figure 5E:
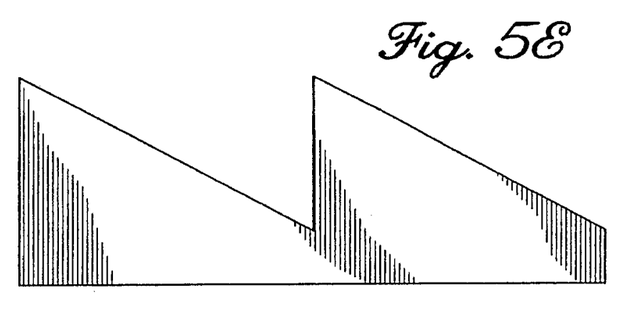
Figure 7A:
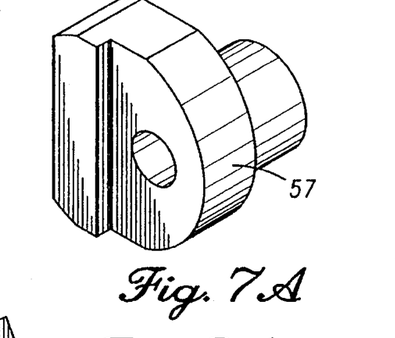
FIG. 7A illustrates a perspective view of a leveling cam.
Figure 7B:
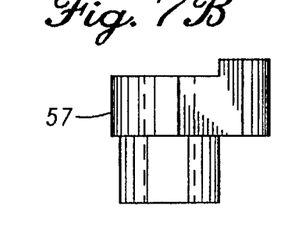
FIG. 7B shows a upper view of the leveling cam.
Figure 7C:
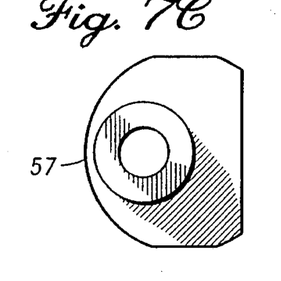
FIG. 7C illustrates a rear view of the leveling cam.
Figures 8A, 8B:
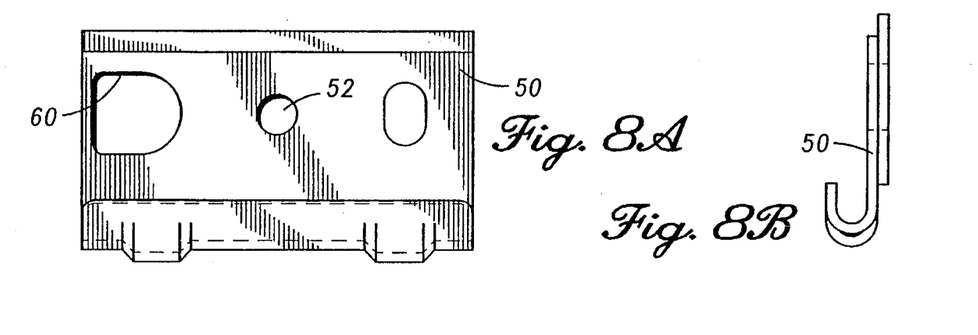
FIG. 8A shows a front view of an accessory hitch.
FIG. 8B illustrates a side view of the accessory hitch.

An alternative leveling mechanism is shown in FIGS. 5 and 6. In this embodiment, cylindrical steering cams 51 mesh with one another and cause offsetting vertical displacement as steering action causes the cams 51 to rotate relative to each other. While various cam profiles can be used, the profiles illustrated in FIGS. 5 and 6 can provide satisfactory results.

Figure 11:
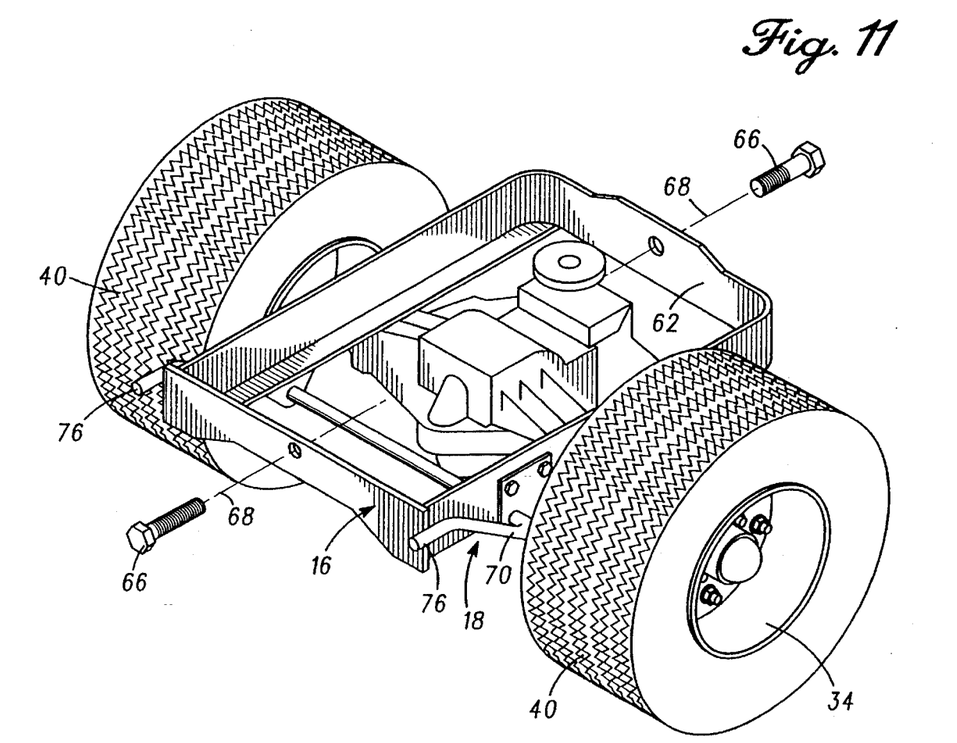
FIG. 11 illustrates a perspective view of a pivoting carrier assembly and a torsion bar assembly.
Figure 12:
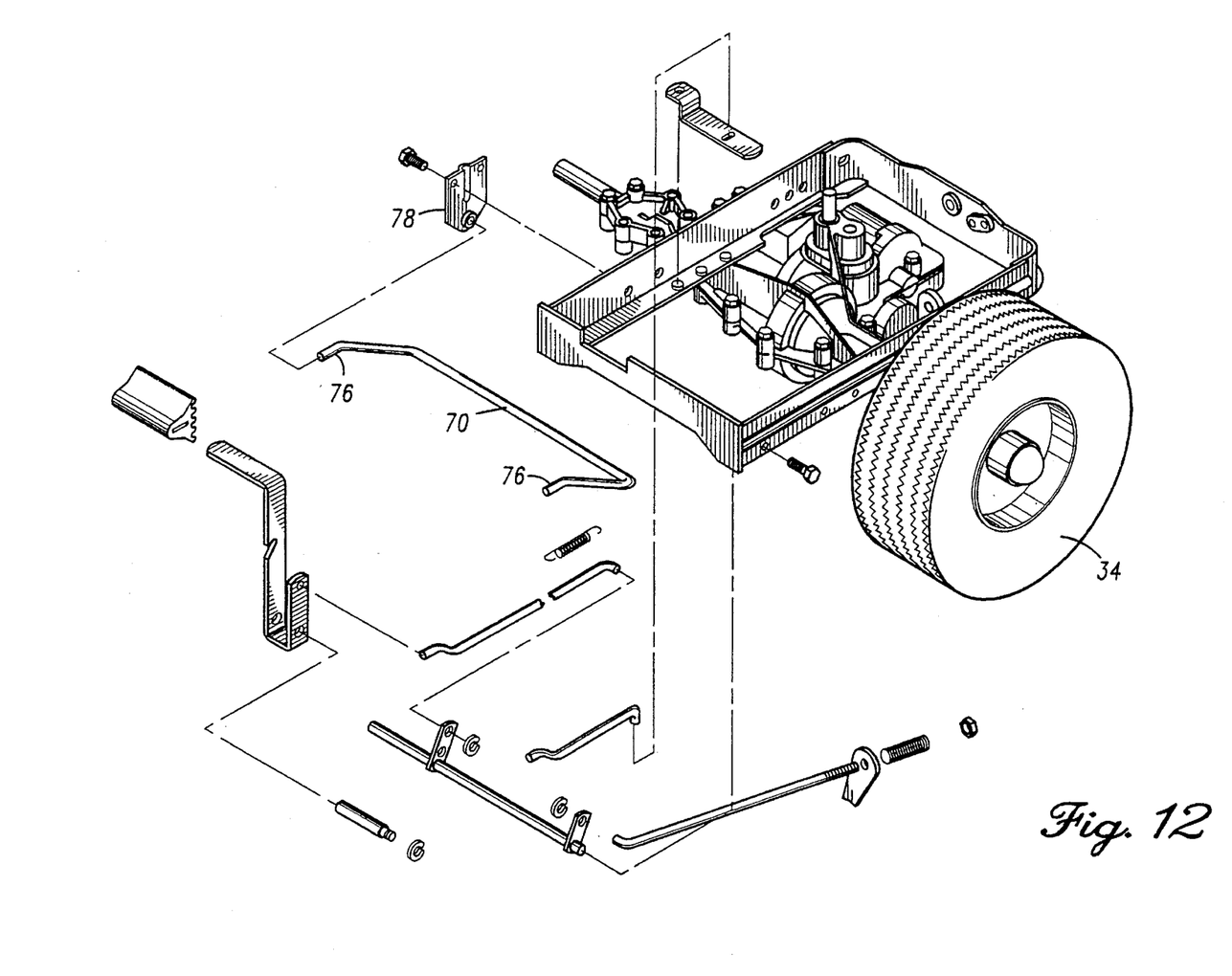
FIG. 12 shows an exploded view of a pivoting carrier assembly of a ride-on mower constructed in accordance with one form of the invention.

The vertical displacement caused by the angled spindles 24 also shifts weight from one portion of the tractor 20 to another as the frame 30 is moved upward and downward. This weight transfer is utilized beneficially through the use of the pivoting carrier assembly 16 and the torsion bar assembly 18, as shown in FIG. 11. Preferably, the pivoting carrier assembly 16 comprises a generally rectangular frame 62 coupled to a transmission and differential carrier unit 64 which is attached to the driving wheels 34 and the driving tires 40. The driving tires 40 can be kept in secure contact with undulating terrain due to the ability of the carrier 64 to pivot about the tractor's longitudinal axis 38. This pivoting action can be accomplished in various conventional ways, but preferably the pivoting carrier assembly 16 pivots on bolts 66 which couple the pivoting assembly carrier 16 to the frame 30. In order to lower the center of gravity of the tractor 20 and therefore increase tractor stability, the pivot axis 68 of the pivoting carrier assembly 16 is located as low as possible.

A torsion bar 70 extends through each side of the pivoting carrier assembly 16 which is preferably located at a rear portion of the ride-on mower 20. The torsion bar 70 provides measured resistance to rotation away from a centered position of the pivoting carrier 64 and the ride-on mower frame 30. High frequency responses such as those provided by conventional springs are avoided with the torsion bar system. This provides a greater feeling of stability for the ride-on mower 20, thereby increasing the operator's confidence and comfort operating the ride-on mower 20.

The torsion bar 70 (shown in detail in FIG. 14) also helps transfer weight from one portion of the ride-on mower 20 to another, through connections with the frame 30. The torsion bar 70 preferably comprises cold formed steel having a diameter selected for the particular application and response characteristics desired. For example, for the applications described herein, torsion bar diameters of approximately 0.5625 inch have produced satisfactory results. Though various connection techniques can be used, preferably, ends 76 of the torsion bar 70 are inserted through torsion bar saddles 78 (shown in FIGS. 13 and 15) and into torsion bar brackets 79 (shown in FIG. 13) affixed to the frame 30 of the ride-on mower 20. The torsion bar brackets 79 are coupled to the frame 30 and preferably comprise a metal tab having a hole disposed therein through which the ends 76 of the torsion bar 70 are inserted. The torsion bar saddles 78 and torsion bar brackets 79 enable the torsion bar 70 to transfer forces primarily vertically upward and downward to and from the frame 30. As the carrier 64 pivots one way, one end of the torsion bar 70 pulls down on the frame 30 (through its coupling with the torsion bar bracket 79) and bends upward, resisting the pivoting action. Simultaneously, the other end 76 of the torsion bar 70 pushes up on the frame 30 and bends, also resisting the pivoting action. The bending of the torsion bar 70 occurs both at angled portions 80 as well as back portion 82 of the torsion bar 70. For example, as shown in FIG. 14B, the angled portion 80 will move counterclockwise while the back portion 82 rotates slightly, within the torsion bar saddles 78, providing a measured resistance caused by the torsional rigidity of the back portion 82 of the torsion bar 70. Opposite movement and rotation occurs at the opposite end of the torsion bar 70, providing a relatively low frequency restoring effect. This action also desirably transfers weight between one portion of the tractor 20 and another, as described in greater detail herein.

Figure 13:
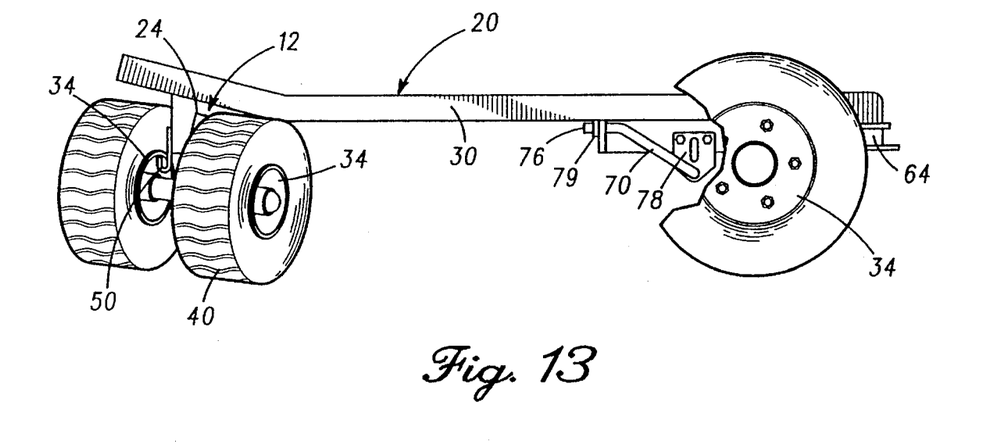
FIG. 13 illustrates a side view of a torsion bar showing a deflection thereof.
Figure 14A:
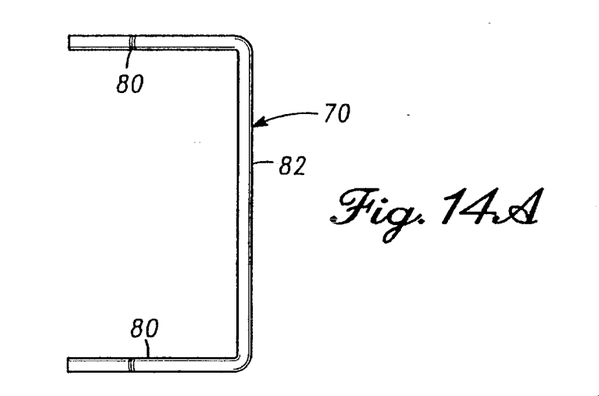
FIG. 14A shows a upper view of a torsion bar constructed in accordance with one form of the invention.
Figure 14B:
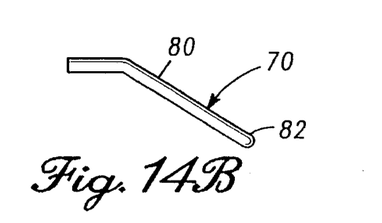
FIG. 14B illustrates a side view of torsion bar illustrated in FIG. 14A.
Figure 14C:
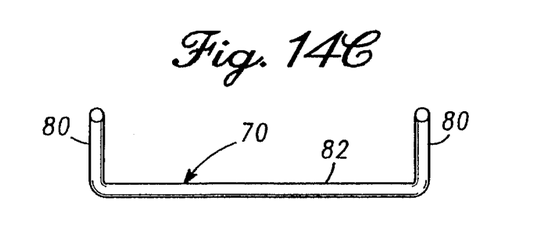
FIG. 14C shows a front view of the torsion bar illustrated in FIGS. 14A and 14B.
Figure 15A:
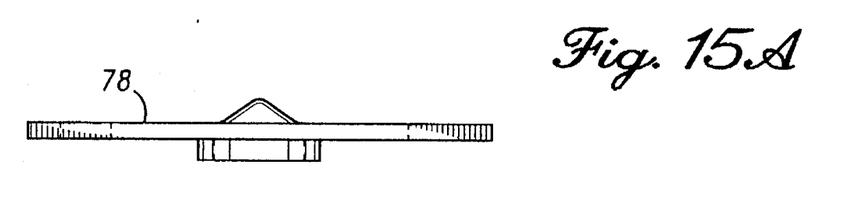
FIG. 15A illustrates an upper view of a torsion bar saddle.
Figures 15B, 15C:
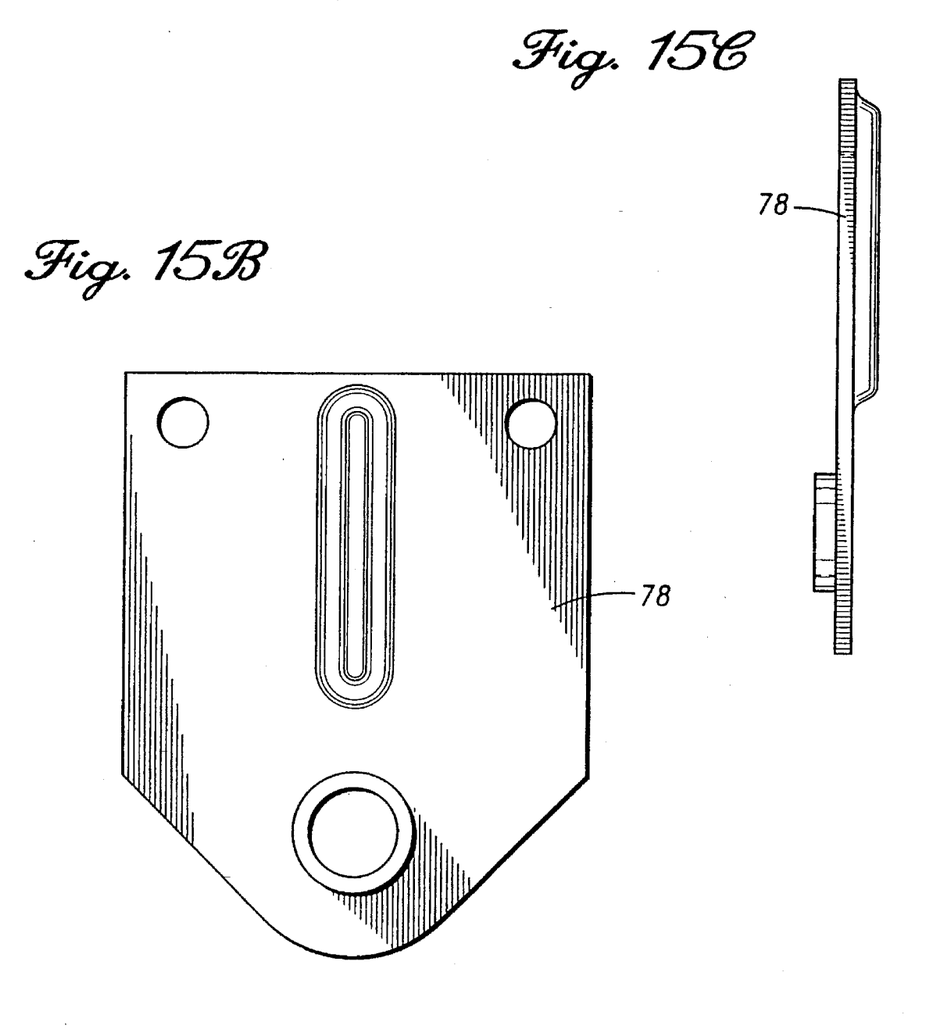
FIG. 15B shows a front view of the torsion bar saddle illustrated in FIG. 15A.
FIG. 15C shows a side view of the torsion bar saddle illustrated in FIGS. 15A and 15B.

Referring to FIG. 13, overall operation of the various aspects of the invention and their changes to effects can be described. As the wheels 34 of the ride-on mower 20 are steered left, the negative caster of the spindles 24 causes the left spindle 24 to lower the left front wheel 34. Simultaneously, the negative caster of the right hand spindle 24 causes the right hand wheel 34 to raise with respect to the frame 30. As the left wheel 34 lowers, the distance between the wheel 34 and the frame 30 increases, thereby vertically displacing the left side of the frame 30 upward. Conversely, the right side of the frame 30 experiences downward vertical displacement as the wheel 34 rises toward the frame 30. This twisting of the front portion of the frame 30 causes the substantially rigid frame 30 to twist in a clockwise direction as viewed from the rear of the ride-on mower 20. The torsion bar 70 resists such movement and increases the weight on the right rear wheel 34. Further, the resistance caused by the torsion bar 70 contacting the relatively fixed right side of the right rear portion of the frame 30 pulls down on the left rear portion of the frame 30. This downward force is transferred up to the left front wheel 34 through the frame 30 and the spindle assembly 12. Accordingly, as shown in the Examples which follow, weight is transferred to the right rear and the left front tire 40 in a left turn.

This ability to perform weight transfer substantially increases dynamic stability of the ride-on mower 20. Prior art ride-on mowers tend to become dynamically unstable by lifting their inside front tire in a turn. Further, a tendency for the driving wheels to slide while turning at relatively high speed is another common example of dynamic instability. Both of these instability problems can be substantially lessened with the preferred embodiments of the invention. Further, operator confidence and comfort are increased due to the increased dynamic stability.

Static stability is increased as well by the structure of the ride-on mower 20. As the angle of inclination to which the ride-on mower 20 is exposed increases, the frame 30 tends to roll over toward the downhill portion of the ride-on mower 20. This action starts to compress the torsion bar 70 which then pulls down on the uphill portion of the frame 30. This effective weight transfer to an uphill portion of the ride-on mower 20 allows the ride-on mower 20 to remain stable at greater angles of inclination, as shown in the following examples.

EXAMPLES

The following examples illustrate weight distributions at the four wheels of the ride-on mower. These examples clearly demonstrate that the features of the present invention enhance desirable weight transfer to provide improved handling characteristics.

EXAMPLE 1

Rear Engine Ride-On Mower
Torsion Bar Disconnected
No Mower
8° Angled Spindles

Straight

| Left Front | 97 | 83 | Right Front |
|---|---|---|---|
| Left Rear | 190 | 186 | Right Rear |

Full Left

| Left Front | 97 | 84 | Right Front |
|---|---|---|---|
| Left Rear | 179 | 196 | Right Rear |

Full Right

| Left Front | 99.5 | 79 | Right Front |
|---|---|---|---|
| Left Rear | 195 | 184 | Right Rear |

1/2 Left

| Left Front | 89.5 | 91 | Right Front |
|---|---|---|---|
| Left Rear | 186 | 190 | Right Rear |

1/2 Right

| Left Front | 109 | 69.5 | Right Front |
|---|---|---|---|
| Left Rear | 195.5 | 182 | Right Rear |

EXAMPLE 2

Rear Engine Ride-On Mower
Torsion Bar Connected
No Mower
8° Angled Spindles

Straight

| Left Front | 86.5 | 96 | Right Front |
|---|---|---|---|
| Left Rear | 193.5 | 186.5 | Right Rear |

Full Left

| Left Front | 117.5 | 68 | Right Front |
|---|---|---|---|
| Left Rear | 163.5 | 213.5 | Right Rear |

Full Right

| Left Front | 68.5 | 116 | Right Front |
|---|---|---|---|
| Left Rear | 225 | 152.5 | Right Rear |

1/2 Left

| Left Front | 111 | 72.5 | Right Front |
|---|---|---|---|
| Left Rear | 181.5 | 198.5 | Right Rear |

1/2 Right

| Left Front | 78.5 | 104.5 | Right Front |
|---|---|---|---|
| Left Rear | 219 | 160.5 | Right Rear |

Example 2 demonstrates the effectiveness of the torsion bar in transferring weight to the inner steering tire and the outer drive wheel while turning. This weight transfer (which is negligible with the torsion bar disconnected as shown in Example 1) helps prevent the inner steering tire from raising off the ground. Further, the weight transfer provides greatest weight at the outside driving tire, thereby powering the tractor through the turn and minimizing plowing effects.

EXAMPLE 3

Side Hill Stability Test
Rear Engine Ride-On Mower
8° Angled Spindles
Mower Attached

| Safe Angle of Inclination | Right Side Downhill | | Left Side Downhill | |
|---|---|---|---|---|
| | Mower Up | Mower Down | Mower Up | Mower Down |
| With Torsion Bar | 21.5° | 21° | 21° | 21° |
| Without Torsion Bar | 17° | 16° | 16° | 15° |

Example 3 illustrates the increased static stability obtained with the torsion bar assembly. The tractor was subjected to an increased angle of inclination until it became statically unstable. Due to a slightly asymmetric weight distribution about the longitudinal axis of the ride-on mower, the figures very slightly depend on the orientation of the tractor. This example shows that the torsion bar in its desirable weight transfer characteristics significantly increase the static stability of the ride-on mower. This allows the operator to safely negotiate greater slopes than is possible with many prior art devices.

EXAMPLE 4

Rear Engine Ride-On Mower
Straight Front Spindles
Torsion Bar Connected
No Mower Straight

| Left Front | 94 | 83.5 | Right Front |
|---|---|---|---|
| Left Rear | 188 | 172 | Right Rear |

Full Left

| Left Front | 95 | 84 | Right Front |
|---|---|---|---|
| Left Rear | 184 | 175 | Right Rear |

Full Right

| Left Front | 93 | 84.5 | Right Front |
|---|---|---|---|
| Left Rear | 191 | 169 | Right Rear |

1/2 Left

| Left Front | 93.5 | 84.5 | Right Front |
|---|---|---|---|
| Left Rear | 186 | 174 | Right Rear |

1/2 Right

| Left Front | 94.5 | 82.5 | Right Front |
|---|---|---|---|
| Left Rear | 191 | 169.5 | Right Rear |

This example illustrates that, even with the torsion bar connected, straight front spindles do not generate the desirable weight transfer generated by the angled front spindles. Accordingly, the synergistic combination effect of the angled front spindles and the torsion bar structure produces the desirable weight transfer characteristics which increase dynamic stability and steering characteristics. However, as demonstrated by Example 5, side hill stability is still increased significantly by the torsion bar, thereby increasing the angle of inclination which the operator can safely traverse with the ride-on mower. Ride-on mower rollover is an extremely serious safety consideration and thus, the torsion bar assembly provides important advantages.

EXAMPLE 5

Rear Engine Ride-On Mower
Straight Front Spindles
Mower Attached

| | Right Down | | Left Down | |
|---|---|---|---|---|
| | Mower Up | Mower Down | Mower Up | Mower Down |
| With Torsion Bar | 20° | 21° | 20° | 21° |
| Without Torsion Bar | 17° | 17° | 18° | 18° |

EXAMPLE 6

Dynamic Turning Stability Test
Rear Engine Ride-On Mower
Turning Radius Comparison
Mower Attached

| Speed | Vertical Spindle | | Angled Spindle | | Comments |
|---|---|---|---|---|---|
| MPH | Left | Right | Left | Right | |
| 1.50 | 13" | 14" | 11" | 11" | |
| 2.62 | 20" | 18" | 11" | 11" | |

-continued

Dynamic Turning Stability Test
Rear Engine Ride-On Mower
Turning Radius Comparison
Mower Attached

| Speed | Vertical Spindle | | Angled Spindle | | Com- |
|---|---|---|---|---|---|
| MPH | Left | Right | Left | Right | ments |
| 4.00 | 36"* | 33"* | 18" | 18" | *Vertical spindle had inside front wheel lift off |
| 5.25 | No test (Could not run without danger of overturn.) | No test (Could not run without danger of overturn.) | 24"–36" | 24"–36" | Angled varied because of slide |

This example highlights the substantial differences in effective turn radius provided by the angled spindle configuration. At lower speeds, the angled spindle provides a slightly better turning radius. However, at normal operating speeds, the differences between the configurations becomes extremely significant. A difference of 7–9" in effective turning radius is demonstrated at 2.62 miles per hour. These results indicate that the angled spindle ride-on mower could effectively track at this speed, while the ride-on mower with vertical spindles is dynamically unstable and is sliding sidewise, increasing the risk of rollover and potentially damaging the turf. Further, the vertical spindle configuration at 4 miles per hour is sliding and has also lifted its inside front wheel. The front wheel liftoff can be extremely disconcerting to an operator, thereby making the operator less comfortable and less satisfied with the ride-on mower overall. Finally, the test at 5.25 miles per hour could not be run with the ride-on mower with vertical spindles due to risk of overturn. However, the angled configuration was sliding at approximately the same amount as the vertical spindle configuration at 4 miles per hour. Further, the risk of overturn was clearly substantially reduced in the angled spindle configuration.

Examples 7–13 for a front engine embodiment demonstrate similar results to the rear-engine embodiment previously described. Further, the more sharply angled (16°) front spindles show an even greater weight transfer than with the 8° angled spindles. However, the amount of vertical displacement generated by these spindles can greatly increase the flexion experienced by the frame. This flexion increases the fatigue on the frame, thereby potentially decreasing the effective life of the frame. Currently, while embodiments using spindle angles far in excess of 16° can be used, preferably, the spindle angle should range between approximately 1°–20° for a balance of effective weight transfer and minimization of frame fatigue.

EXAMPLE 7

Front Engine Ride-On Mower
Torsion Bar Disconnected
No Mower
8° Angled Spindles

Straight

| Left Front | 120 | 107 | Right Front |
|---|---|---|---|
| Left Rear | 159 | 155 | Right Rear |

Full Left

| Left Front | 128 | 101 | Right Front |
|---|---|---|---|
| Left Rear | 136 | 177 | Right Rear |

Full Right

| Left Front | 109 | 119 | Right Front |
|---|---|---|---|
| Left Rear | 172 | 139 | Right Rear |

1/2 Left

| Left Front | 123 | 106 | Right Front |
|---|---|---|---|
| Left Rear | 139 | 174 | Right Rear |

1/2 Right

| Left Front | 116 | 112 | Right Front |
|---|---|---|---|
| Left Rear | 162 | 150 | Right Rear |

EXAMPLE 8

Front Engine Ride-On Mower
Torsion Bar Connected
No Mower
(8° Angled Front Spindles)

Straight

| Left Front | 108 | 117 | Right Front |
|---|---|---|---|
| Left Rear | 155 | 159 | Right Rear |

Full Left

| Left Front | 141 | 90 | Right Front |
|---|---|---|---|
| Left Rear | 124 | 187 | Right Rear |

Full Right

| Left Front | 80 | 151 | Right Front |
|---|---|---|---|
| Left Rear | 190 | 118 | Right Rear |

-continued
Front Engine Ride-On Mower
Torsion Bar Connected
No Mower
(8° Angled Front Spindles)

1/2 Left

| | | | |
|---|---|---|---|
| Left Front | 130 | 99 | Right Front |
| Left Rear | 133 | 179 | Right Rear |

1/2 Right

| | | | |
|---|---|---|---|
| Left Front | 92 | 137 | Right Front |
| Left Rear | 180 | 130 | Right Rear |

EXAMPLE 9

Front Engine Ride-On Mower
Torsion Bar Disconnected
No Mower
16° Angled Front Spindles Straight

| | | | |
|---|---|---|---|
| Left Front | 117 | 100 | Right Front |
| Left Rear | 162 | 157 | Right Rear |

Full Left

| | | | |
|---|---|---|---|
| Left Front | 122 | 92 | Right Front |
| Left Rear | 177 | 147 | Right Rear |

Full Right

| | | | |
|---|---|---|---|
| Left Front | 75 | 136 | Right Front |
| Left Rear | 159 | 162 | Right Rear |

1/2 Left

| | | | |
|---|---|---|---|
| Left Front | 119 | 93 | Right Front |
| Left Rear | 172 | 155 | Right Rear |

1/2 Right

| | | | |
|---|---|---|---|
| Left Front | 83 | 129 | Right Front |
| Left Rear | 156 | 167 | Right Rear |

EXAMPLE 10

Front Engine Ride-On Mower
Torsion Bar Connected
No Mower
16° Angled Spindles

Straight

| | | | |
|---|---|---|---|
| Left Front | 108 | 117 | Right Front |
| Left Rear | 155 | 159 | Right Rear |

Full Left

| | | | |
|---|---|---|---|
| Left Front | 154 | 68 | Right Front |
| Left Rear | 106 | 210 | Right Rear |

Full Right

| | | | |
|---|---|---|---|
| Left Front | 59 | 166 | Right Front |
| Left Rear | 220 | 90 | Right Rear |

1/2 Left

| | | | |
|---|---|---|---|
| Left Front | 136 | 88 | Right Front |
| Left Rear | 114 | 205 | Right Rear |

1/2 Right

| | | | |
|---|---|---|---|
| Left Front | 80 | 140 | Right Front |
| Left Rear | 212 | 102 | Right Rear |

EXAMPLE 11

Front Engine Ride-On Mower
Torsion Bar Connected
No Mower
8° Angled Spindles
(200# in Seat)

Straight:
| Left Front | 112 | 120 | Right Front |
| Left Rear | 215 | 204 | Right Rear |

Full Left:
| Left Front | 142 | 95 | Right Front |
| Left Rear | 170 | 244 | Right Rear |

Full Right:
| Left Front | 87 | 151 | Right Front |
| Left Rear | 252 | 160 | Right Rear |

1/2 Left:
| Left Front | 124 | 110 | Right Front |
| Left Rear | 190 | 228 | Right Rear |

1/2 Right:
| Left Front | 102 | 132 | Right Front |
| Left Rear | 240 | 175 | Right Rear |

EXAMPLE 12

Front Engine Ride-On Mower
Torsion Bar Disconnected
No Mower
8° Angled Front Spindles
(200# in Seat)

Straight:
| Left Front | 116 | 116 | Right Front |
| Left Rear | 206 | 210 | Right Rear |

Full Left:
| Left Front | 111 | 121 | Right Front |
| Left Rear | 198 | 218 | Right Rear |

Full Right:
| Left Front | 127 | 104 | Right Front |
| Left Rear | 216 | 200 | Right Rear |

1/2 Left:
| Left Front | 110 | 122 | Right Front |
| Left Rear | 201 | 215 | Right Rear |

1/2 Right:
| Left Front | 122 | 109 | Right Front |
| Left Rear | 215 | 201 | Right Rear |

EXAMPLE 13

Front Engine Ride-On Mower
Mower Attached

| | Right Down | | Left Down | |
|---|---|---|---|---|
| | Mower Up | Mower Down | Mower Up | Mower Down |
| With Torsion Bar | 23° | 22° | 27° | 24° |
| Without Torsion Bar | 20° | 20° | 21° | 20° |

EXAMPLE 14

Turning Radius Comparison
Front Engine Ride-On Mower
No Mower

| Speed MPH | Vertical Spindle | | Angled Spindle | | Comments |
|---|---|---|---|---|---|
| | Left | Right | Left | Right | |
| 1.50 | 14" | 12-1/2" | 12-1/2" | 11" | |
| 2.62 | 14" | 12-1/2" | 12-1/2" | 11" | |
| 4.00 | 23" | 18" | 18-1/2" | 16" | |

Turning Radius Comparison
Front Engine Ride-On Mower
No Mower

| Speed MPH | Vertical Spindle | | Angled Spindle | | Comments |
|---|---|---|---|---|---|
| | Left | Right | Left | Right | |
| 5.25 | 26" to 44" | 24" to 40" | 26" to 30" | 24" to 28" | * |

*Turning more consistent with the angled spindles and torsion bar. The high and low numbers differed because of lack of traction.

While preferred embodiments have been illustrated and described, it should be understood that changes and modifications can be made therein without departing from the invention in its broader aspects. Various features of the invention are defined in the following claims.

What is claimed is:

1. A steering system for a ride-on mower, comprising:
   a steering means for steering said ride-on mower including a substantially L-shaped spindle for supporting a wheel;
   said spindle being rotatably coupled to said ride-on mower about an axis of rotation; and said axis of rotation being inclined from vertical substantially along a longitudinal axis of said ride-on mower.

2. The device as defined in claim 1 wherein a lower portion of said spindle is coupled to a wheel and an upper portion of said spindle is coupled to said steering means.

3. The device as defined in claim 2 wherein said lower portion is located substantially forwardly of at least part of said upper portion.

4. The device as defined in claim 1 wherein said axis of rotation is inclined from vertical in the range of one to about twenty degrees.

5. A level adjusting device for a ride-on mower, comprising:

steering means for steering said ride-on mower;

accessory means connected to said ride-on mower for carrying out a function powered by said ride-on mower;

level adjusting means for leveling said accessory means being coupled to said accessory means; and said steering means selectively actuating said level adjusting means upon movement of said steering means.

6. The device as defined in claim 5 wherein said level adjusting means includes a cam means.

7. The device as defined in claim 5 where said accessory means comprises at least one of a flail-type cutting unit, a sickle cutting unit, a reel cutting unit and a rotary cutting unit.

8. The device as defined in claim 5 wherein said accessory means comprises a ride-on mower cutting unit.

9. The device as defined in claim 5 wherein said level adjusting means comprises a cam coupled to a linkage which is coupled to said accessory means.

10. The device as defined in claim 5 wherein said level adjusting means is coupled to said steering means and comprises a cam connected to a linkage which is coupled to said accessory means.

11. The device as defined in claim 5 wherein said steering means is coupled to a spindle having a first structural means for selectively causing a first vertical displacement of a portion of said ride-on mower, and said level adjusting means having a second structural means for selectively providing a second vertical displacement to said accessory means.

12. The device as defined in claim 11 wherein said second vertical displacement substantially offsets an effect of said first vertical displacement on said accessory means.

13. The device as defined in claim 11 wherein said level adjusting means includes a cam.

14. The device as defined in claim 11 wherein said spindle has an axis of rotation inclined from vertical.

15. A level adjusting device for a ride-on mower, comprising:

steering means for steering said ride-on mower;

accessory means connected to said ride-on mower for carrying out a function powered by said ride-on mower;

level adjusting means for leveling said accessory means being coupled to said accessory means;

said steering means selectively actuating said level adjusting means upon movement of said steering means;

said steering means being coupled to a spindle means having a first structural means capable of causing a first vertical displacement of a portion of said ride-on mower, causing a second vertical displacement of said accessory means, and said level adjusting means having a second structural means capable of providing a third vertical displacement to said accessory means; and said third vertical displacement substantially offsetting said second vertical displacement on said accessory means.

16. A ride-on mower comprising:

a frame;

a pair of steerable wheels mounted on said frame for steering movement between a straight ahead position, wherein each of said steerable wheels tracks substantially straight ahead, and a turned position wherein each of said steerable wheels tracks to the side to turn said frame, said steerable wheels being further mounted on said frame with negative caster so that when said steerable wheels are in said straight ahead position said frame is maintained substantially level relative to the ground and when said steerable wheels are in said turned position said frame is displaced from said substantially level position relative to the ground;

a hitch on said frame for coupling to an accessory attachment, said hitch being displaceable relative to said frame; and a linkage coupled between said hitch and at least one of said steerable wheels for displacing said hitch relative to said frame in response to movement of said steerable wheels to said turned position to compensate for movement of said frame from said substantially level position and thereby maintain the accessory attachment in a desired orientation relative to the ground as the frame turns.

17. A ride-on mower as defined in claim 16 wherein said linkage includes a link arm and a cam.

18. A ride-on mower as defined in claim 16 wherein at least one of said steerable wheels is coupled to a spindle coupled to said linkage.

* * * * *